United States Patent
Bitra et al.

(10) Patent No.: US 9,723,437 B1
(45) Date of Patent: Aug. 1, 2017

(54) METHOD AND APPARATUS FOR IMPROVING POSITIONING PERFORMANCE ON A MOBILE DEVICE WITH CARRIER AGGREGATION CAPABILITIES

(71) Applicant: QUALCOMM Incorporated, San Diego, CA (US)

(72) Inventors: Suresh Kumar Bitra, Mangalagiri (IN); Arun Kumar Sharma Tandra, Hyderabad (IN); Ashwin Kumar Donthula, Hyderabad (IN); Bhaskara Batchu, Ameenpur Village (IN)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 15/012,596

(22) Filed: Feb. 1, 2016

(51) Int. Cl.
H04M 11/04 (2006.01)
H04W 4/02 (2009.01)
(Continued)

(52) U.S. Cl.
CPC .............. *H04W 4/02* (2013.01); *G01S 5/02* (2013.01); *H04W 4/22* (2013.01); *H04W 88/06* (2013.01)

(58) Field of Classification Search
CPC ..... H04L 5/001; H04L 5/0053; H04L 5/0098; H04L 5/0032; H04L 1/1854; H04L 5/0035; H04L 1/1812; H04L 1/1887; H04L 27/0006; H04L 41/5029; H04L 47/14; H04L 41/0896; H04L 41/5051;
(Continued)

(56) References Cited

U.S. PATENT DOCUMENTS 8,903,415 B2 12/2014 Kazmi et al.
2012/0083288 A1 4/2012 Siomina
(Continued)

FOREIGN PATENT DOCUMENTS

WO 2014070066 A1 5/2014
WO WO-2015023224 A2 2/2015
WO 2015105813 7/2015

OTHER PUBLICATIONS

International Search Report and Written Opinion—PCT/US2016/067350—ISA/EPO—Mar. 27, 2017.

*Primary Examiner* — Nimesh Patel
(74) *Attorney, Agent, or Firm* — BSTZ/Qualcomm

(57) ABSTRACT

Disclosed is a method and apparatus for performing a positioning process utilizing wireless communication network reference signals. The method may include processing, by a mobile device with carrier aggregation, a voice call via a first Radio Access Technology (RAT), the processing of the call causing second RAT capabilities of the mobile device to go out of service. The method may also include obtaining assistance data that includes information for capturing reference signals of a wireless communications network suitable for performing a positioning process with the mobile device during the voice call over the first RAT. Furthermore, based on the obtained assistance data, the method may include searching for the reference signals using an available receiver of the mobile device to access the wireless communications network. The method may also include providing signal measurements generated from captured reference signals to a position determining entity.

30 Claims, 6 Drawing Sheets

(51) Int. Cl.
*H04W 4/22* (2009.01)
*G01S 5/02* (2010.01)
*H04W 88/06* (2009.01)

(58) Field of Classification Search
CPC ....... H04L 47/12; H04L 47/20; H04L 47/805; H04L 47/822; H04L 43/0888; H04L 12/1489; H04L 41/5032; H04L 43/026; H04L 1/0026; H04L 5/0091; H04L 12/189; H04L 5/0048; H04L 5/007; H04W 76/023; H04W 24/10; H04W 8/005; H04W 24/02; H04W 36/0083; H04W 72/04; H04W 4/26; H04W 4/001; H04W 28/026; H04W 36/0088; H04W 52/244; H04W 76/048; H04W 36/0005; H04W 36/0066; H04W 36/0072; H04W 72/042
See application file for complete search history.

(56) References Cited

U.S. PATENT DOCUMENTS

| | | |
|---|---|---|
| 2012/0309341 A1 | 12/2012 | Ward |
| 2013/0188510 A1 | 7/2013 | Siomina et al. |
| 2015/0215729 A1 | 7/2015 | Opshaug et al. |
| 2015/0215799 A1* | 7/2015 | Kazmi ................. H04W 24/08 370/252 |
| 2015/0327159 A1 | 11/2015 | Gude et al. |
| 2017/0013630 A1* | 1/2017 | Franz ........................ H04L 5/00 |

* cited by examiner

METHOD AND APPARATUS FOR IMPROVING POSITIONING PERFORMANCE ON A MOBILE DEVICE WITH CARRIER AGGREGATION CAPABILITIES

FIELD

The subject matter disclosed herein relates generally to performing a positioning process utilizing wireless communication network reference signals.

BACKGROUND

As the use of mobile communications devices, such as cellular telephones, becomes more pervasive, there will be more wireless networks that support the wireless communication of such devices. Furthermore, the more such devices are used in different facets of users' lives, such as personal use and work use, the usage becomes fragmented. For example, a single user may have one device for personal use, and a second device for work use, where the devices utilize different wireless communications network technologies.

Some mobile communications devices include multiple subscriber capabilities. That is, such a mobile device can have more than one subscriber identification module (SIM) for subscribing to, and providing service on, different carrier networks. The single mobile device, with multiple SIMs, can provide the user access to multiple wireless communications networks. Continuing the example above, the single user would be able to use one device for work and personal communications, both with different subscriber identifications.

One such device for accessing multiple networks as different subscribers, is the dual-SIM dual-standby (DSDS) mobile device with carrier aggregation (CA) (hereinafter DSDS+CA mobile device). The different SIMs provide subscriptions/access to different wireless communications networks, such as LTE, SRLTE, WCDMA, GSM, etc. The dual-standby capabilities of the mobile device choose which SIM is active to send/receive a call, and cause the other SIM to go out of service. Carrier aggregation, however, enables the device to coordinate data received from the different wireless communications networks. Thus, when a DSDS+CA mobile device receives a call, on either subscriber technology, the other subscriber technology goes out of services. As an example, when such a device utilizes a first subscription to an SRLTE/CSFB wireless communications network and a second subscription to an SRLTE/3G/2G wireless communications network, a non-voice over LTE call on either subscription/SIM will cause the LTE capabilities of the mobile device to go out of service.

When global navigation satellite system (GNSS) positioning is initiated in a DSDS+CA mobile device during a non-LTE voice call, the mobile device will connect to a communications network. The time to first fix for the GNSS positioning purposes may take a considerable amount of time, thereby consuming processing and power resources of the mobile device, based on the device's ability to receive GPS signals and the associated strength of those GPS signals. This problem is exacerbated when the DSDS+CA mobile device is indoors, or any other low visibility environment, which can reduce or prevent the DSDS+CA mobile device's ability to obtain the necessary GPS signals. Furthermore, when the positioning process is initiated in response to an emergency voice call, the length of time and lack of precision for obtaining the mobile device's position, can be unacceptable in an emergency location scenario.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
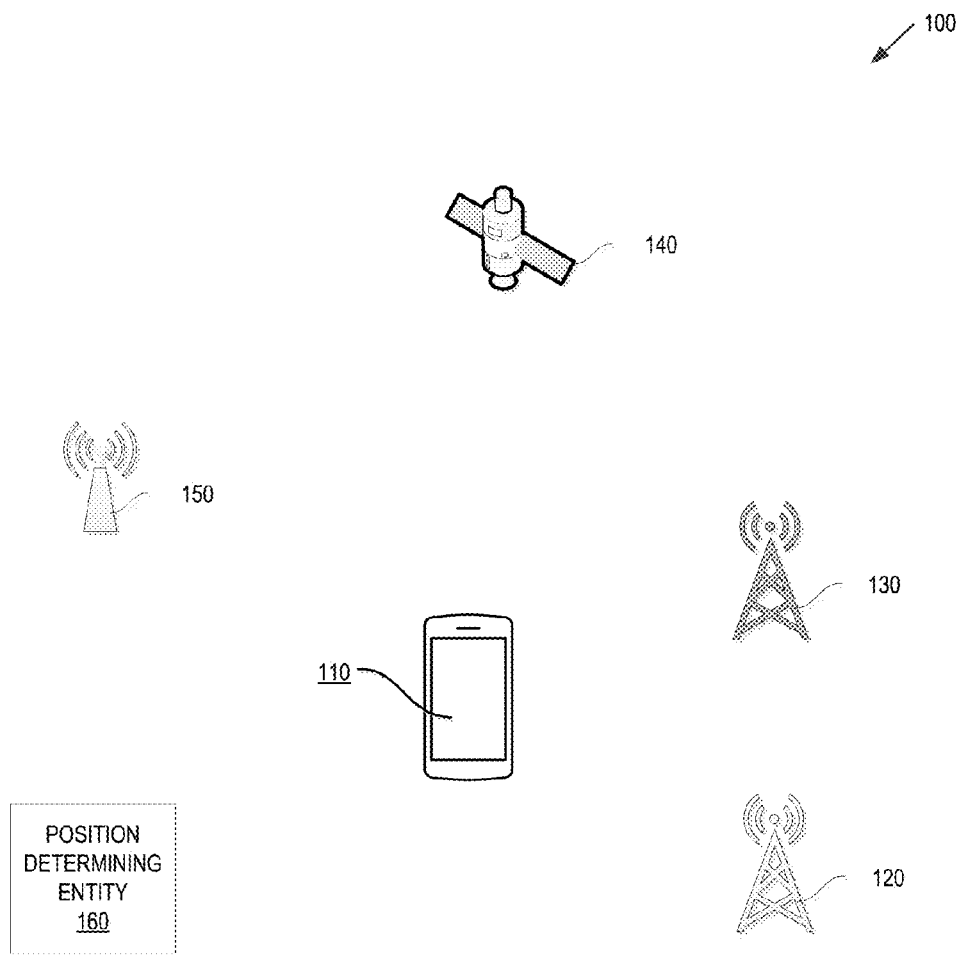
FIG. 1 is a block diagram of an exemplary system architecture for performing a positioning process in a mobile device having carrier aggregation capabilities.

FIG. 1 is a block diagram of an exemplary system architecture for performing a positioning process in a mobile device having carrier aggregation capabilities. In one embodiment, the system 100 includes a mobile device 110. Mobile device 110 is a mobile computing device, such as a mobile telephone, personal digital assistant, tablet computer, wearable device, gaming device, medical device, etc. capable of sending and receiving wireless communications over the wireless communications network(s). In one embodiment, the mobile device 110 is a dual-sim dual-standby mobile device having carrier aggregation capabilities. However, consistent with the discussion herein, mobile device 110 may have carrier aggregation capabilities and include more than two SIMs, or may be a single SIM mobile device, with a carrier aggregation receiver. Embodiments of mobile devices are discussed in greater detail below.

The system may also include two or more wireless communications networks established by one or more of base stations (e.g., base stations 120 and 130), wireless access point 150, and satellite system 140. In one embodiment, a first wireless communications network is established by base station 120, and a second wireless communications network is established by base station 130. Although only two base stations are illustrated, additional base stations can be deployed to further established the first and second wireless communications networks, as well as to established additional wireless communications networks. In embodiments, different wireless communication networks may each operate using the same or different wireless communication technology supporting the same or different Radio Access Technologies (RATs), as supported by the base stations (e.g., base stations 120 and 130), one or more wireless access points (e.g., wireless access point 150), and one or more satellite systems (e.g., satellite system 140). For example, any combination of LTE, CDMA, CDMA2K, GSM, etc. communication networks, as well as communications network supporting future RATs (e.g., a 5G communications network), may coexist within the system architecture 100 of FIG. 1. Furthermore, the different wireless communications networks established by base stations 120 and 130 may be wireless communications networks of the same or different carrier.

In one embodiment, base station 120, as well as additional base stations (not illustrated) that are part of the same first wireless communications network, provide a wireless communications network that utilizes a first type of RAT, such as LTE. Furthermore, the wireless communications network may provide additional support for circuit switched fallback (CSFB) services, such as providing voice and messaging services to mobile devices utilizing communication technologies, such as non-LTE GSM.

In one embodiment, base station 130, as well as additional base stations (not illustrated) that are part of the same second wireless communications network, provide a communications network utilizing a second RAT, such as a non-LTE RAT. In one embodiment, the second communications network is a GSM, LTE, etc. communications network.

In one embodiment, mobile device 110 may communicate over both the first communications network established by base station 120 and the second communications network established by base station 130. In one embodiment, to enable communication over the different wireless communications networks with different technologies, mobile device 110 may include one, two, or more subscriber information modules (SIMs). That is, mobile device 110 is capable of receiving, sending, and processing signals over a first RAT (e.g., over an LTE communications network) established by base station 120, and is capable of receiving, sending, and processing signals over a second RAT (e.g., from a non-LTE communications network) established by base station 130. Each SIM within mobile device 110 may provide access to different wireless communications networks of different carriers. Furthermore, each SIM may enable mobile device 110 to connect to different wireless communication networks of the same carrier.

In one embodiment, positioning determining entity 160 is communicably coupled to one or more of the wireless communications networks via base station 120, base station 130, and/or wireless access point 150. As will be discussed in greater detail below, position determining entity 160 can determine a real-world location of the mobile device 110. Furthermore, the location of mobile device 110 can be determined by the position determining entity 160 based on one or more types of signals, measurements, and/or reports communicated from the mobile device 110 to the positioning determining entity 160. For example, position determining entity 160 may use reference signal time difference (RSTD) measurements generated by, and reported from, the mobile device 110 to perform an observed time difference of arrival (OTDOA) positioning determination for mobile device 110. As another example, position determining entity 160 may use round trip time (RTT) measurements generated by, and reported from, the mobile device 110 to perform an enhanced cellID (ECID) positioning determination for mobile device 110. Another positioning method that may be performed using the reference signals is a mobile device 110 based wireless WAN positioning determination using LTE CRS/PRS signal measurements where mobile device 110 generates ranging measurements from captured CRS/PRS signals and uses the measurements with assistance data (e.g., base station almanac data) to compute its own position, such as a CRS/PRS downlink positioning process. Furthermore, pilot signal measurements generated by mobile device from pilot phase measurement (PPM) signals of a plurality of base stations may be used by position determining entity 160 to perform a trilateration based positioning determination, such as advanced forward link trilateration (AFLT). As yet another example, global navigation satellite system (GNSS) signals/measurements may also be collected, generated, and reported from, mobile device 110 to position determining entity to perform a GNSS positioning determination for mobile device 110. In one embodiment, position determining entity 160 can determine the mobile device's 110 position using one or more different positioning determination techniques, based on the type of positioning data reports received from mobile device 110, to perform either a standard or hybrid positioning determination. In embodiments, once position determining entity 160 has calculated the position of mobile device 110, based on the received data, position determining entity 160 provides the position to mobile device 110, to an emergency services provider 110, to any of the base stations (e.g., base station 120 and/or 130), to other wireless communications network entities (not shown), etc. Although position determining entity 160 is illustrated external to mobile device 110, in one embodiment, the mobile device itself may include the position determining entity and utilize the measurements to perform the positioning process(es) discussed herein within the mobile device. In yet another embodiment, a position determining entity within mobile device 110 may perform the positioning process(es) discussed herein in conjunction with position determining entity 160.

In one embodiment, for example, mobile device 110 is a dual-SIM dual standby mobile device, where each of the SIMs within mobile device 110 enables the mobile device 110 to connect/subscribe to different communications networks. The different wireless communications network may be provided by different wireless network carriers (e.g., a first SIM enables access to carrier A's LTE communications network, and a second SIM enables access to carrier B's non-LTE communications network). Furthermore, a single SIM within mobile device 110 may also enable mobile device 110 to connect/subscribe to wireless communication networks utilizing different RATs provided by the same wireless network carrier (e.g., the first SIM enables access to carrier A's LTE communications network, and also enables access to carrier A's non-LTE communications network). In one embodiment, mobile device's 110 carrier aggregation (CA) capabilities enable coordinating communication and/or data usage over the different communications networks and/or subscriptions. However, because the mobile device 110 is a dual standby mobile device, when mobile device 110 utilizes a first SIM to connect to one network (e.g., to place or receive a call), the other SIM providing access to the other network goes out of service. In embodiments, discussed in greater detail below, the mobile device 110 may be either a single receiver mobile device or a dual receiver mobile device capable of communicating over the different wireless communications networks using different RATs. Furthermore, as will be discussed in greater detail below, the carrier aggregation capabilities of the mobile device 110 may be used to listen for, and collect, signals broadcast over a first communication network utilizing a first RAT and/or a second communications network utilizing a second RAT to perform a positioning process on the mobile device and/or in conjunction with the positioning determining entity 160.

Furthermore, the positioning process can be performed by the mobile device 110 utilizing RAT reference signals even when RAT capabilities of the mobile device for the communications network supporting that RAT are out of service, and when the mobile device is connected to another communications network that utilizes a different RAT.

Figure 2A:
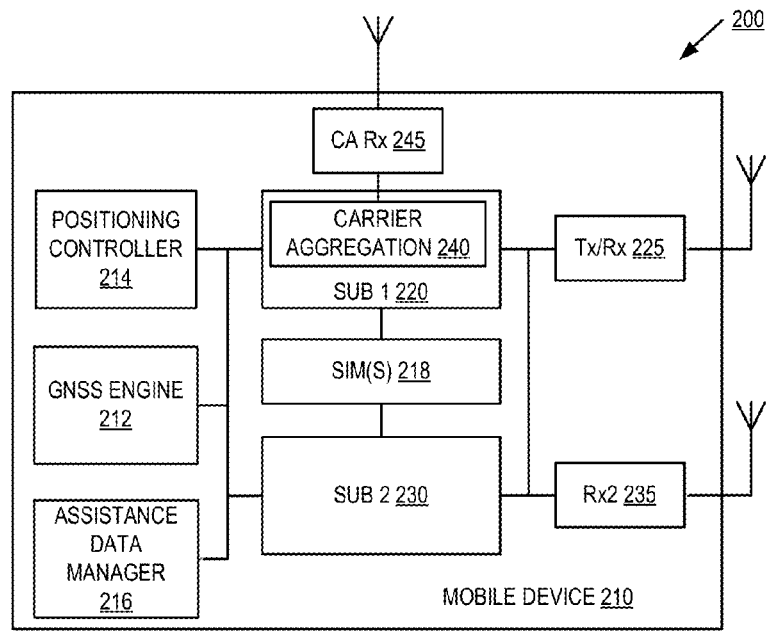
FIG. 2A is block diagram of one embodiment of a dual receiver dual-standby mobile device having carrier aggregation capabilities.

FIG. 2A is block diagram of one embodiment 200 of a dual receiver dual-standby mobile device 210 having carrier aggregation capabilities.

The illustrated dual receiver dual standby mobile device 210 may include one, two, or more SIMs (e.g., SIM(s) 218) for accessing wireless communications networks of the same or different wireless communications network carriers. A first sub 220 enables a subscription to a first wireless communication network, and a first transceiver/receiver 225 coupled with the first sub 220 enables the sending and receiving of signals over a first RAT using the first wireless communication network (e.g., a wireless communications network established by base station 120). The dual receiver dual-standby mobile device 210 further includes a second sub 230 coupled with a second receiver 235 for sending and receiving signals over a second RAT using a second wireless communication network (e.g., a wireless communications network established by base station 130). For example, the sub SIM 220 may be coupled with a receiver/transceiver that supports a SRLTE/CSFB wireless communications network, and the second sub 230 may be coupled with a receiver that supports another wireless communications technology (e.g., SRLTE, WCDMA, etc.). In one embodiment, the second sub 230 utilizes the transceiver 225 to send signals using the second RAT over the second wireless communications network. Furthermore, in embodiments, the same SIM from SIM(s) 218 may provide access to different wireless communications networks of the same carrier utilizing subs 220 and 230, or different SIMs from SIM(s) 218 may each provide access utilizing subs 220 and 230 to a different wireless communications network provided by different carriers.

The dual receiver dual standby mobile device 210 further includes a carrier aggregation module 240 coupled with a carrier aggregation receiver 245. The carrier aggregation receiver 245 is an independently tunable receiver of mobile device 210 capable of tuning to networks using different RATs, such as tuning to either an LTE network or a non-LTE network. In one embodiment, the carrier aggregation receiver 245 is not a transceiver, and is therefore not capable of transmission. However, the carrier aggregation receiver 245 can tune to the different wireless communications networks to coordinate data usage between the networks for the mobile device 210, determine which of the SIM(s) 218 to use for a connection, share resources by connections established for subs 220 and 230 and/or SIM(s) 218, etc. Carrier aggregation module 240 is responsible for tuning the carrier aggregation receiver 245 to the appropriate network using the appropriate RAT.

As discussed herein, for embodiments of dual receiver dual standby mobile devices supporting LTE and non-LTE RATs, such as mobile device 210, when a voice over non-LTE call is processed using the first sub 220, LTE capabilities provided by the first sub 220 and services provided by the second sub 230 both go out of service. Similarly, when a voice over non-LTE call is processed using the second sub 230, the entire first sub 220 (including LTE services provided by the first sub 220) will go out of service. As yet another example, when a non-LTE voice call over a first LTE communication network is processed by a first sub (e.g., sub 220), the second sub (e.g., sub 230) that may provide access to a second LTE communication network providing specific system information blocks discussed in greater detail below will go out of service. As discussed above, this is due to the dual receiver dual-standby mobile device having only one transceiver 225.

Figure 2B:
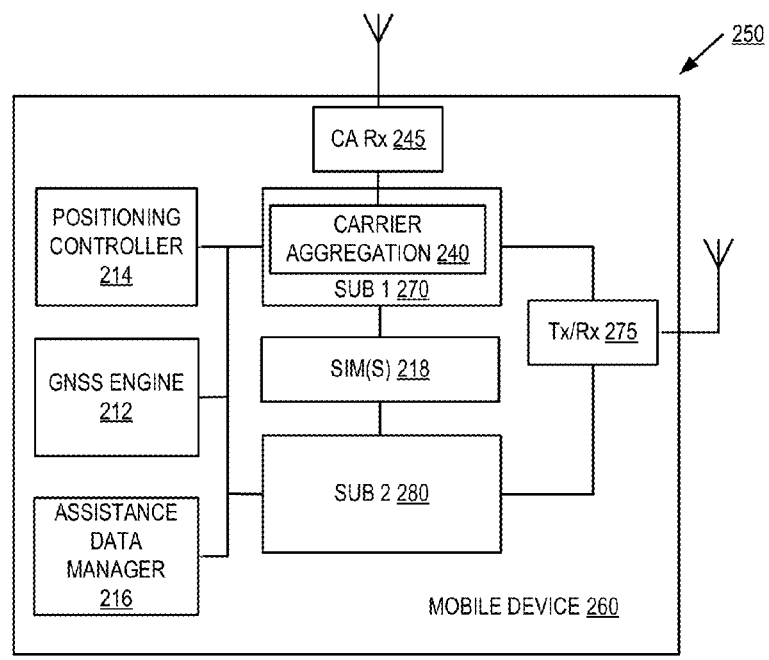
FIG. 2B is block diagram of one embodiment of a single receiver dual-standby mobile device having carrier aggregation capabilities.

FIG. 2B illustrates a similar mobile device 260 to mobile device 210 illustrated in FIG. 2A. However, mobile device 260 is a single receiver dual-standby mobile device. As discussed above, mobile device 260 may also include one or more SIMs (e.g., SIM(s) 218) for providing access to different carrier networks. In mobile device 260, both subs (e.g., subs 270 and 280) share the single transceiver/receiver 275 for sending and receiving signals on their respective wireless communication networks. Furthermore, mobile device 260 also includes a carrier aggregation module 240 for controlling the carrier aggregation receiver 245 for coordinating usage of the different subs 270 and 280, and the different SIMs 218. For example, in an embodiment where mobile device 260 processes a voice call utilizing a non-LTE RAT, all LTE RAT services provided by sub 270 and sub 280 go out of service as a result of also having a single transceiver 275 chain.

As discussed in greater detail below, both mobile devices (e.g., 210 and 260) further include GNSS engine 212, positioning controller 214, and assistance data manager 216 for performing a positioning process. In one embodiment, with reference to FIG. 2A, and similarly for FIG. 2B, after initiating (e.g., receiving or placing) a voice call over a first RAT (e.g., voice call initiated on a network utilizing a non-LTE RAT), which causes the second RAT capabilities (e.g., LTE capabilities) of mobile device 210 to go out of service, a positioning process is started by GNSS engine 212. In one embodiment, the positioning process is automatically triggered in response to detecting that the mobile device 210 is participating in an emergency call. In other embodiments, the positioning process may be started in response to different factors, such as in response to a user request, in response to a position-based application running on the mobile device 210, in response to a network initiated location request, in response to a mobile terminated location request, or any other mobile device, positioning entity, third party server, or network request.

In one embodiment, during the positioning process, positioning controller 214 determines that second RAT capabilities are out of service, and instructs the carrier aggregation module 240 to tune the carrier aggregation receiver 245 to a wireless communications network supporting either the first or second RATs, such as an LTE communications network or a CDMA2000 network, which is broadcasting signals that will enable mobile device 210 to perform and/or participate in the positioning process. In one embodiment, because the carrier aggregation receiver 245 is an independently tunable receiver (e.g., can be tuned to any supported communications network regardless of which sub is connected to which network), the carrier aggregation receiver 245 is able to listen for various broadcast information transmitted over networks supporting either the first or second RATs (e.g., over LTE RAT or non-LTE RAT communications networks). In one embodiment, carrier aggregation module 240 utilizes the carrier aggregation receiver 245 to search for, and obtain, specific types of reference signals. In one embodiment, for example, the carrier aggregation receiver 245 tunes to an LTE network, and gathers PRS and/or CRS reference signals. In another embodiment, the carrier aggregation receiver 245 tunes to a CDMA2000 network, and gathers PPM signals. In embodiments where more than one independently tunable receiver is available during a call, the available receivers of mobile device 210 can tune to a combination of different networks for gathering different types of signals.

In the embodiments discussed herein, simultaneous with the voice call over the first RAT, the transceiver/receiver 225 used for the voice call is also used to obtain positioning assistance data. In one embodiment, however, the positioning controller 214 may initially determine if positioning assistance data for capturing PRS, CRS, PPM, and/or RSTD information for performing a positioning process is already stored on mobile device 210 or can be generated by mobile device 210 from prior assistance data. In either embodiment, assistance data may be obtained by assistance data manager 216 periodically and/or before the initiation of the positioning process. The assistance data manager 216 of mobile device 210 is able to utilize bandwidth within a user and/or control signaling channel established during the voice call to obtain, and decode, assistance data in parallel with the ongoing call when positioning assistance data is needed. In one embodiment, the assistance data can be obtained by the assistance data manager 216 of mobile device 210 upon a request sent to a network entity having the assistance data, an assistance data server, or other source. The assistance data, whether obtained from a network entity, stored by mobile device 210, or generated by mobile device from previous data, enables the positioning controller 214 to control the carrier aggregation receiver 245 to tune to the appropriate frequencies at the appropriate times to obtain the needed signal data. For example, if mobile device 210 is performing and/or participating in an OTDOA positioning process using PRS signals broadcast over an LTE network, the assistance data can include, among other data, reference signal broadcast timing, reference signal uncertainty data, range of search window, sequence availability identification, etc. As another example, if mobile device 210 is performing a mobile device 110 based wireless WAN positioning determination based on CRS signals broadcast over an LTE network, the assistance data can include, among other data, base station almanac information such as cell IDs that provide assistance data, frequency of those cells, cell bandwidth, indication of normal or extended cyclic prefix, expected time of arrival, time of arrival uncertainty, etc. As yet another example, if mobile device 210 is performing a positioning process using PPM signals broadcast over a CDMA2000 network, the assistance data can include, among other data, pseudo-noise (PN) offset phase information relevant to AFLT positioning. Additional types of reference signals and associated assistance data, such as GNSS assistance data for GNNS signal acquisition, can be utilized in accordance with the discussion herein. Thus, the assistance data can be GNSS assistance data used for GNSS signal acquisition, AFLT assistance data used for CDMA2000 signal PPM measurements, and OTDOA/mobile-based WWAN assistance data. Furthermore, in embodiments, mobile device 210 can perform or participate in a hybrid positioning based on one or more of GNSS, AFLT, and OTDOA/mobile-based WWAN positioning methods. These hybrid positioning methods enable a position of mobile device 210 to be determined with sufficiently high levels of accuracy, even in indoor/low-visibility scenarios where GNSS based positioning would fail, be inefficient, or inaccurate.

In one embodiment, with this assistance data, the positioning controller 214 of the mobile device 210 obtains the necessary signals (e.g., PRS, CRS, or PPM) by tuning the carrier aggregation receiver 245 to the appropriate network for capturing the necessary signals during the time windows indicated in the assistance data. From the signal data, the positioning controller 214 decodes the data within the signals and generates one or more measurements for performing the positioning process, such as RSTD measurements calculated from PRS signals. These measurements are then provided to a positioning entity (e.g., position determining entity 160 in FIG. 1) within the communications network to which the mobile device 210 is connected, which can use the measurements to calculate a position of the mobile device 210. In embodiments, the position of the mobile device 210 determined by the positioning entity can be returned to the mobile device 210, transmitted to an emergency services provider (e.g., when mobile device 210 is engaged in an emergency services call), transmitted to a network entity (e.g., a position tracking entity within a wireless communications network), etc., as well as any combination thereof. In another embodiment, the mobile device 210 itself can include its own position determining entity (not shown) to perform the positioning process without having to communicate with a network based position determining entity (e.g., position determining entity 160 in FIG. 1).

Furthermore, in one embodiment, where the mobile device 210 is able to receive satellite signals, the assistance data can, in some circumstances, further assists mobile device 210 in receiving, for example, GPS PRM measurements. Such GNSS signals enable mobile device 210 to collect the PRM measurements and provide them to the positioning entity (e.g., position determining entity 160 in FIG. 1) for performing a GNSS based positioning process. In one embodiment, the GNSS positioning process and the one or more of the other positioning processes discussed herein (e.g., one based on PRS, CRS, and/or PPM signals) can be carried out in parallel to enable the position determining entity to perform a hybrid positioning process. Furthermore, additional positioning techniques, such as enhanced cell ID (ECID) using the round trip times of one or more of the gathered signals may be used to determine a coarse position of the mobile device 210 in conjunction with, or as a seed value for, the other positioning processes discussed herein. Such hybrid positioning processes may be utilized to increase the accuracy of the position determination for mobile device 210, to increase the efficiency of the position determination, etc.

In the embodiments discussed herein, the OTDOA and downlink positioning processes enable the mobile device 210 to participate in a positioning process using LTE network data, which can be both faster and more power efficient than GNSS positioning. Furthermore, the OTDOA and downlink positioning processes can be performed by the mobile device 210 even when GNSS signal data is weak or not available (e.g., when the mobile device 210 is indoors or in other weak signal environments). Additionally, because the mobile device 210 is in a connected state during the positioning process (e.g., the positioning process occurs during the voice call), the power management states of the device already in use for the call can be further used to carry out the positioning processes discussed herein. That is, since all mobile device 210 phase-locked loops (PLLs) will be active, they can be used to tune to desired frequencies (e.g., tuning to LTE or CDMA signals for CRS/PRS/PPM measurements) with little/no power impact. The power savings are great compared to the power consumption caused due to GNSS based positioning. The assistance data gathering using the control and/or user signaling channels, signal gathering by the available tuner, and measurement reporting will not need to use additional power management states, and the positioning processes can be performed with minimal/no impact on the power consumption of the mobile device.

Although FIGS. 2A and 2B illustrate and describe the carrier aggregation receiver 245 as the available/independently tunable receiver, other embodiments can use any available receiver capable of being independently tuned to a communications network that uses a RAT providing appropriate reference signals to perform the information acquisition and positioning processes discussed herein. Furthermore, the mobile device discussed herein need not be limited by the number of SIMs within the device, as devices with additional SIMs (e.g., two SIM, three SIM, four SIM, etc. devices) may also utilize the information acquisition and positioning processes discussed herein. Furthermore, a mobile device having a single SIM, but also having an independently tunable receiver for carrier aggregation, may also utilize the information acquisition and positioning processes discussed herein.

Figure 3:
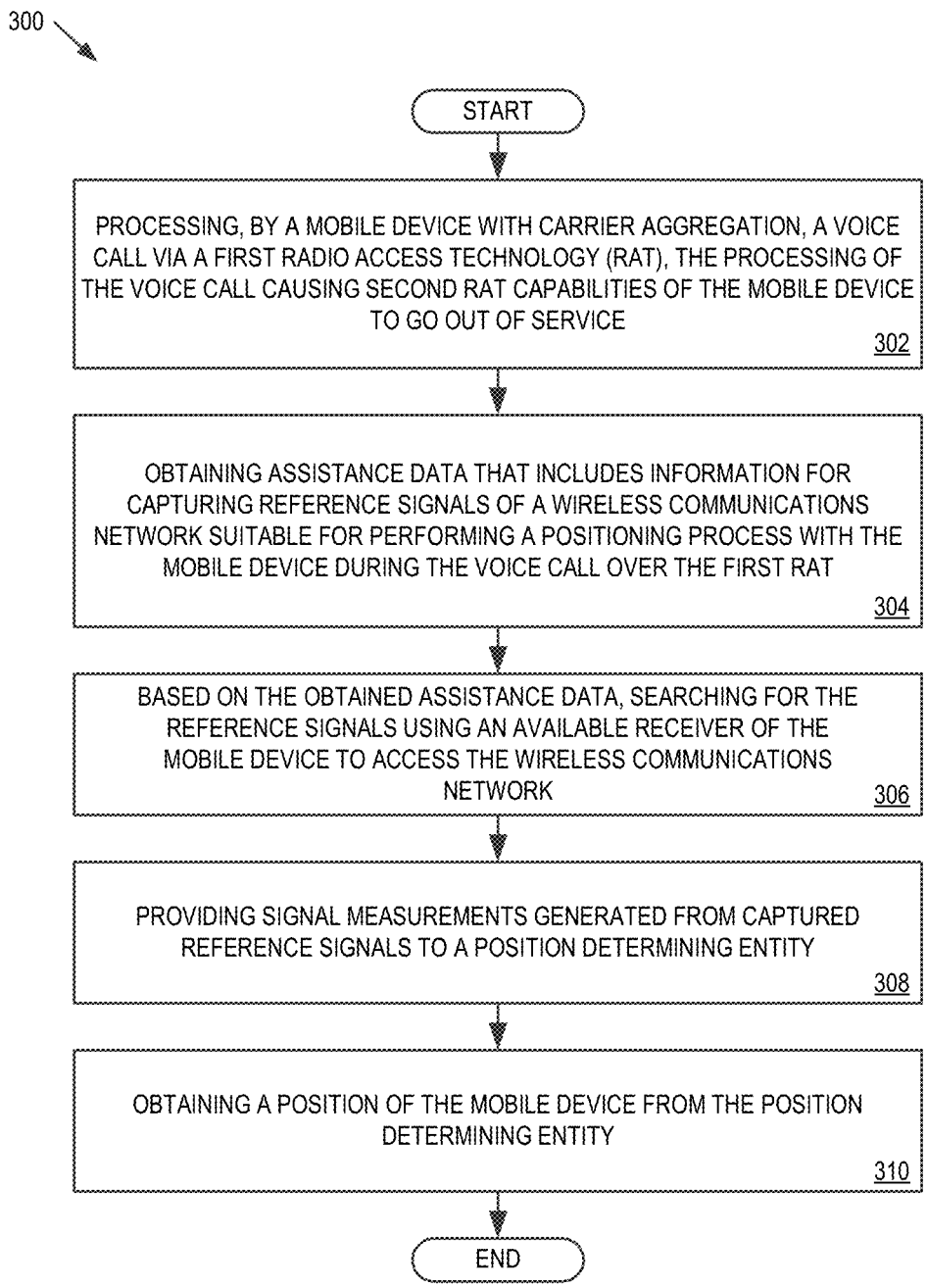
FIG. 3 is a flow diagram of one embodiment of a method for performing a positioning process with a mobile device having carrier aggregation capabilities based, at least in part, on wireless communication network reference signals.

FIG. 3 is a flow diagram of one embodiment of a method 300 for performing a positioning process with a mobile device having carrier aggregation capabilities based, at least in part, on wireless communication network reference signals. The method 300 is performed by processing logic that may comprise hardware (circuitry, dedicated logic, etc.), software (such as is run on a general purpose computer system or a dedicated machine), firmware, or a combination. In one embodiment, the method 300 is performed by a mobile device (e.g., mobile device 110, 210, or 260).

Referring to FIG. 3, processing logic at the mobile device begins by processing a voice call via a first RAT, the processing of the voice call causing second RAT capabilities of the mobile device to go out of service (processing block 302). In embodiments, discussed herein, the mobile device may be a dual subscription dual-standby mobile device with carrier aggregation capabilities (DSDS+CA mobile device). Furthermore, the mobile device may have a different receiver for each sub within the mobile device, or a single receiver shared by each sub within the mobile device. However, each of these devices utilizes a single transceiver for transmitting signals during the voice call over the first RAT. For example, where the second RAT is an LTE RAT and the first RAT is a non-LTE RAT, when a voice call over the non-LTE RAT communicably couples the mobile device's single transceiver to a wireless communications network during the voice call, LTE RAT capabilities of the mobile device go out of service.

Processing logic then obtains assistance data that includes information for capturing reference signals of a wireless communications network suitable for performing a positioning process with the mobile device during the voice call over the first RAT (processing block 304). In one embodiment, the assistance data may be obtained in response to a positioning process being initiated by a user of the mobile device during the voice call, by the mobile device itself (e.g., in response to an application, emergency condition, etc. triggered on the mobile device), or by the wireless communications network to which the mobile device is communicably coupled (e.g., by a base station, wireless access point, etc. detecting an emergency services call). Furthermore, in embodiments, the assistance data may also be obtained, such as during a voice call before the positioning process is initiated, when a voice call is placed, before the voice call is placed, as well as during other periods. In one embodiment, the positioning process that is initiated may include the initiation of one or more positioning processes that utilize first and/or second RAT reference signals of different wireless communications networks (e.g., LTE and/or non-LTE reference signals). The assistance data obtained by processing logic would provide signal configuration data, such as range of search window, identification data for signal, uncertainty data, etc. For example, the assistance data may include information relevant to PRS and/or CRS signals of an LTE wireless communications network when the initiated positioning process is an OTDOA and/or downlink positioning process that utilizes PRS and/or CRS signals. As another example, the assistance data may include information for PPM signals of a CDMA2000 wireless communications network relevant to a positioning process performed using the PPM signals.

Based on the obtained assistance data, processing logic searches for the reference signals using an available receiver of the mobile device to access the wireless communications network (processing block 306). In one embodiment, the available receiver is not a transceiver and thus is not capable of transmitting signals. However, the mobile device having carrier aggregation capabilities includes a carrier aggregation receiver typically utilized by the device when coordinating communication and/or data usage of the mobile device between different wireless communications networks. Because the carrier aggregation receiver is an independently tunable receiver (e.g., can be tuned to different radio reception frequencies regardless of the other receiver/transceiver of mobile device being dedicatedly assigned to a specific network or placed out-of-service), the carrier aggregation receiver can be used by processing logic as the available receiver. Processing logic tunes the carrier aggregation receiver to a selected wireless communications network to access the network based on the type of positioning process that was initiated and/or the type of reference signals to be gathered. For example, the carrier aggregation receiver can be tuned to access an LTE wireless communications network to listen for, and gather, PRS and/or CRS signals. Similarly, the carrier aggregation receiver can be tuned to access a CDMA2000 wireless communications network to listen for, and gather PPM reference signals. In embodiments discussed herein, additional receivers can also be tuned to access additional networks when gathering signals relevant for performing the positioning process and/or for performing a hybrid positioning process.

Processing logic then provides signal measurements generated from captured reference signals to a position determining entity (processing block 308) and obtains a position of the mobile device from the position determining entity (processing block 310). As discussed herein, the signal measurements, such as RSTD measurements, RTT measurements, GNSS measurements, etc., can be communicated to a wireless communications network entity, such as a position determining entity. Such positioning determining entities utilize the received measurements to compute a position of the mobile device based on one or more of the types of information. This determined position may then be transmitted back to the mobile device. However, in one embodiment, the mobile device itself may include a position determining entity that utilizes the measurements to perform the positioning process within the mobile device. In yet another embodiment, a position determining entity within mobile device may perform the positioning process in conjunction with an external position determining entity (e.g., position determining entity 160).

Figure 4:
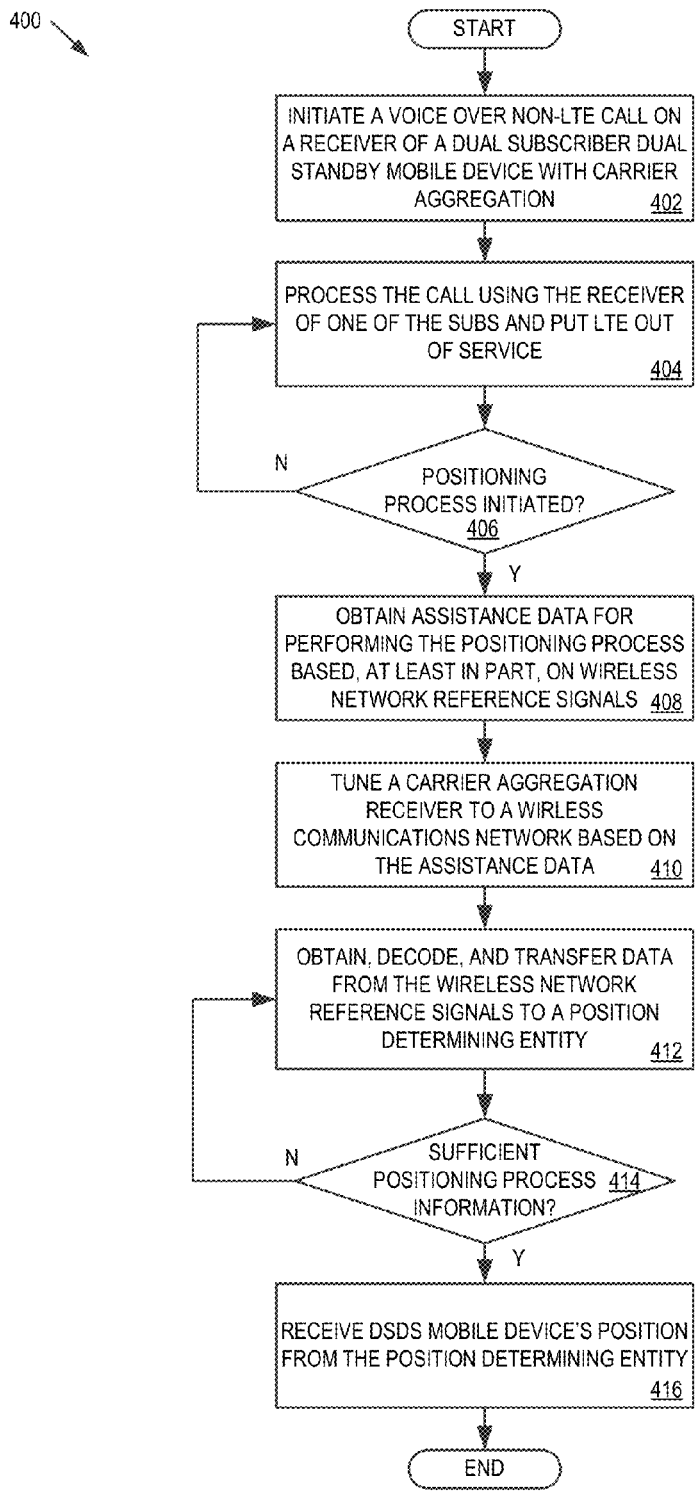
FIG. 4 is a flow diagram of one embodiment of another method for performing a positioning process with a mobile device having carrier aggregation capabilities.

FIG. 4 is a flow diagram of one embodiment of another method 400 for performing a positioning process with a mobile device having carrier aggregation capabilities. The method 400 is performed by processing logic that may comprise hardware (circuitry, dedicated logic, etc.), software (such as is run on a general purpose computer system or a dedicated machine), firmware, or a combination. In one embodiment, the method 400 is performed by a mobile device (e.g., mobile device 110, 210, or 260). Furthermore, the process illustrated in FIG. 4 provides an example where LTE and non-LTE RATs are utilized in a dual subscriber dual standby mobile device with carrier aggregation.

Referring to FIG. 4, processing logic begins by initiating a voice over non-LTE call on a dual subscriber dual standby mobile device with carrier aggregation (DSDS+CA) (processing block 402). Processing logic then processes the call using the receiver of one of the subs and puts the LTE capabilities of the mobile device out of service (processing block 404). As discussed herein, a DSDS+CA mobile device may support communication over LTE wireless communication networks, as well as over non-LTE wireless communications networks, where the different networks can be provided by the same carrier or different carriers. As further discussed herein, when a voice over non-LTE call is received and/or placed by the DSDS+CA mobile device (e.g., a CSFB call utilizing a sub that supports LTE, or a GSM or other RAT call utilizing a different sub that supports communication on an different network), the LTE capabilities provided by both subs of the DSDS+CA device go out of service.

Processing logic then determines if a positioning process is initiated (processing block 406). For example, during the non-LTE voice call, a user may initiate a positioning process on a mobile device by requesting a location-based service, launching a location-based application, triggering an emergency function, etc. As another example, a positioning process may alternatively be initiated by the mobile device or the wireless network, such as when the mobile device detects an emergency condition or when the wireless network seeks location/tracking information associated with the mobile device. When a positioning process is not initiated, the process returns to processing block 404 to continue processing the call.

However, when a positioning process has been initiated, the process will continue to process the call, but also advances to processing block 408 and obtain assistance data for performing the positioning process based, at least in part, on wireless network reference signals (processing block 408). In one embodiment, processing logic is able to utilize bandwidth in a user and/or control signaling channel already established for the ongoing call to obtain the assistance data. Thus, obtaining the assistance data need not consume additional bandwidth and/or resources of the mobile device during the call. As discussed above, the assistance data includes data that identifies the network, timing, identification, etc. for the signals to be collected. For example, search window range, signal identifiers, expected data, uncertainty information, etc. can be specified in the assistance data to enable processing logic to collect PRS and/or CRS signals broadcast on an LTE network, and PPM signals broadcast on a CDMA2000 network. Based on the received assistance data, processing logic tunes a carrier aggregation receiver to an appropriate wireless communications network (processing logic 410). In embodiments, additional independently tunable receivers can be tuned to the same and/or other wireless communications networks for obtaining additional types of reference signals.

Processing logic obtains, decodes, and transfers data from the wireless network reference signals to a position determining entity (processing block 412). That is, processing logic utilizes the available receiver and the assistance data to obtain the appropriate reference signals (e.g., PRS, CRS, and PPM), as well as other signals (e.g., GNSS). These signals may then be decoded, and measurements generated from the signals, such as round trip time measurements, reference signal time difference measurements, etc. The measurements are suitable for performing a positioning process and are therefore transferred to the position determining entity. However, in other embodiments, processing logic of the mobile device could perform the positioning determination at the mobile device, or in conjunction with the position determining entity.

When there is insufficient positioning process information (processing block 414), processing logic returns to processing block 412 to obtain additional data suitable for determining the mobile device's position. For example, processing logic and the position determining entity may exchange messages indicating when sufficient information has been received by position determining entity to complete the position determination. As another example, processing logic can send a predetermined number of measurements sufficient to enable the position determining entity to complete the positioning determination. When there is sufficient positioning process information, processing logic receives the DSDS mobile device's position as determined by the position determining entity (processing block 416). As discussed herein, in the case of an emergency services call, this position may be transferred from the mobile device to an emergency services provider. Furthermore, the positioning determining entity may communicate the mobile device's position to the emergency services provider.

Figure 5:
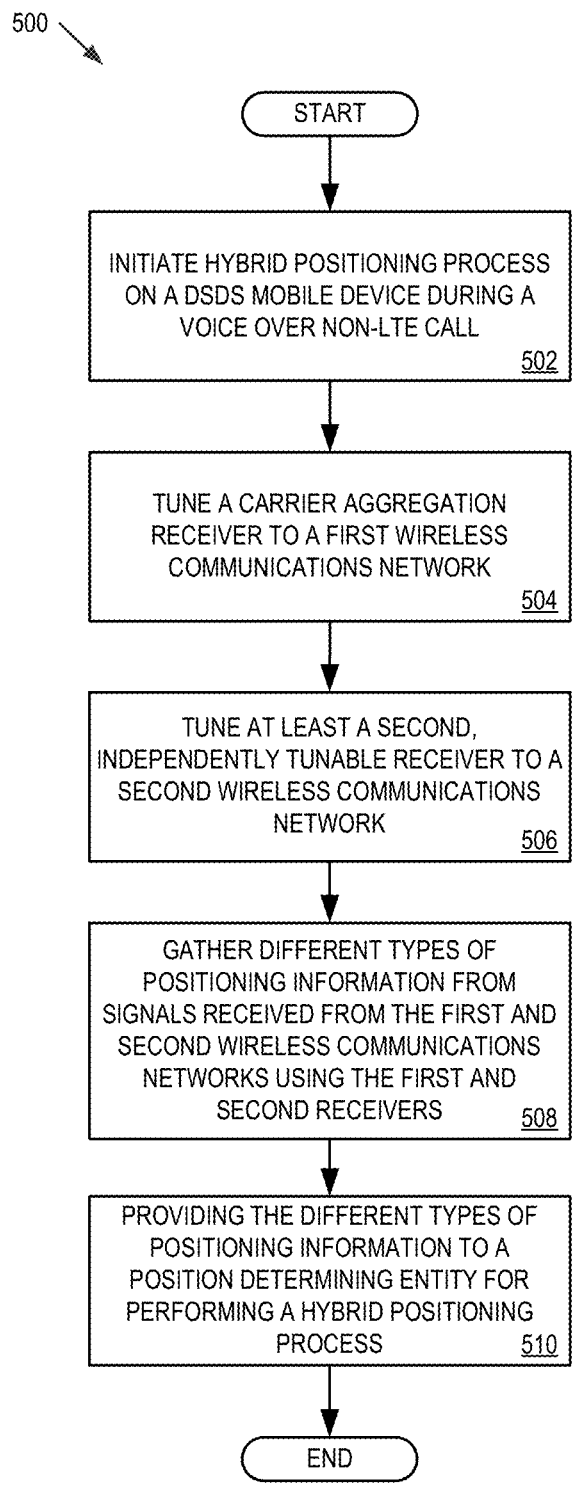
FIG. 5 is a flow diagram of one embodiment of a method for tuning different receivers of a mobile device to different wireless communications networks for performing a hybrid positioning process.

FIG. 5 is a flow diagram of one embodiment of a method 500 for tuning different receivers of a mobile device to different wireless communications networks for performing a hybrid positioning process. The method 500 is performed by processing logic that may comprise hardware (circuitry, dedicated logic, etc.), software (such as is run on a general purpose computer system or a dedicated machine), firmware, or a combination. In one embodiment, the method 500 is performed by a mobile device (e.g., mobile device 110, 210, or 260).

Referring to FIG. 5, processing logic begins by initiating a hybrid positioning process on a dual subscriber dual standby (DSDS) mobile device during a voice call over a first RAT (processing block 502). In one embodiment, the first RAT is a non-LTE RAT, such as CDMA2000, GSM, etc. In one embodiment, the hybrid positioning process is initiated when the DSDS mobile device includes two or more independently tunable receivers that are not participating in the call. For example, the DSDS mobile device may include a carrier aggregation receiver as well as one or more independently tunable wireless communication network, wireless local area network, GNSS, etc. receivers.

Processing logic then tunes the carrier aggregation receiver to a first wireless communications network (processing block 504) and tunes at least a second, independently tunable, receiver to a second wireless communications network (processing block 506). For example, the carrier aggregation receiver could be tuned to a communications network that supports an LTE RAT, even though LTE is currently out of service due to the voice call over the first, non-LTE RAT, in order to gather PRS and/or CRS reference signals. At the same time, processing logic could also tune a GNSS and/or wireless communications network receiver to a different communications network to receive GNSS signals from one or more GNSS satellites and/or to receive PPM signals broadcast over a CDMA2000 (e.g., non-LTE) wireless communications network. In embodiments, any number of independently tunable receivers can be tuned by processing logic to different networks to gather different types of signal data useful for performing the hybrid positioning process.

Processing logic gathers the different types of positioning information from signals received from the first and second wireless communications networks using the first and second receivers (processing block 508) and provides the different types of positioning information to a position determining entity for performing the hybrid positioning process (processing block 510). In embodiment, processing logic of the mobile device could perform the hybrid positioning process at the mobile device utilizing the different type of positioning information. In either scenario, the determined position of the mobile device could thereafter be utilized by the mobile device, communicated to a network entity, etc. as discussed herein.

Figure 6:
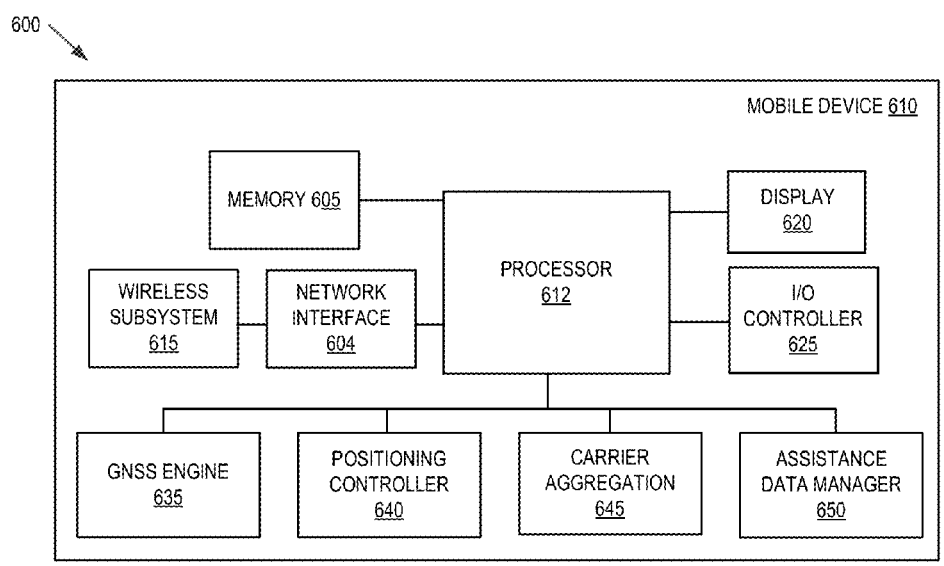
FIG. 6 is block diagram of one embodiment of a mobile device.

FIG. 6 is block diagram of one embodiment 600 of a mobile device. Mobile device 610 provides additional details for mobile device 210 discussed above in FIG. 2A and mobile device 260 discussed above in FIG. 2B.

In one embodiment, mobile device 610 is a system, which may include one or more processors 612, a memory 605, I/O controller 625, network interface 604, and display 620. Mobile device 610 may also include a number of processing modules, which may be implemented as hardware, software, firmware, or a combination, such as GNSS engine 635, positioning controller 640, carrier aggregation module 645, and assistance data manager 650. It should be appreciated that mobile device 610 may also include, although not illustrated, a user interface (e.g., microphones, keyboard, touch-screen, or similar devices), a power device (e.g., a battery), as well as other components typically associated with electronic devices. Although only a single wireless subsystem 615 is illustrated, it is understood that network interface 604 may also be coupled to a number of wireless subsystems 615 (e.g., Bluetooth, WLAN, Cellular, or other networks) to transmit and receive data streams through a wireless link to/from a network. Network interface 604 may also be a wired interface for direct connection to networks (e.g., the Internet, Ethernet, or other wireless systems). In one embodiment, wireless subsystem 615 couples mobile device 610 to a wireless communications network established by one or more wireless access points, base stations, satellite systems, etc., such as an LTE and non-LTE wireless communications networks.

Memory 605 may be coupled to processor 612 to store instructions for execution by processor 612. In some embodiments, memory 605 is non-transitory. Memory 605 may also store one or more processing modules (i.e., GNSS engine 635, positioning controller 640, carrier aggregation module 645, and/or assistance data manager 650) to implement embodiments described below. It should be appreciated that embodiments of the invention as described herein may be implemented through the execution of instructions, for example as stored in the memory 605 or other element, by processor 612 of mobile device 610 and/or other circuitry of mobile device 610 and/or other devices. Particularly, circuitry of mobile device 610, including but not limited to processor 612, may operate under the control of a program, routine, or the execution of instructions to execute methods or processes in accordance with embodiments of the invention. For example, such a program may be implemented in firmware or software (e.g. stored in memory 605 and/or other locations) and may be implemented by processors, such as processor 612, and/or other circuitry of mobile device 610. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines, managers, or modules described herein may be performed by mobile device 610 itself and/or some or all of the functions, engines or modules described herein may be performed by another system connected through I/O controller 625 or network interface 604 (wirelessly or wired) to mobile device 610. Thus, some and/or all of the functions may be performed by another system and the results or intermediate calculations may be transferred back to mobile device 610.

It should be appreciated that when the device discussed herein is a mobile or wireless device, that it may communicate via one or more wireless communication links through a wireless network that are based on or otherwise support any suitable wireless communication technology. For example, in some aspects mobile device may associate with a network including a wireless network. In some aspects the network may comprise a body area network or a personal area network (e.g., an ultra-wideband network). In some aspects the network may comprise a local area network or a wide area network. In some aspects, the network may comprise a wireless communication network(s). A wireless device may support or otherwise use one or more of a variety of wireless communication technologies for communicating over the wireless communications network(s), protocols, or standards such as, for example, LTE, CDMA2K, CDMA, TDMA, OFDM, OFDMA, WiMAX, and WLAN. Similarly, a wireless device may support or otherwise use one or more of a variety of corresponding modulation or multiplexing schemes. A mobile wireless device may wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a headset (e.g., headphones, an earpiece, etc.), a user I/O device, or any other suitable device.

In some aspects a wireless device may comprise an access device (e.g., a WLAN access point) for a communication system. Such an access device may provide, for example, connectivity to another network (e.g., a wide area network such as the Internet or a cellular network) via a wired or wireless communication link. Accordingly, the access device may enable another device (e.g., a WLAN station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for performing a mobile device positioning process, comprising:
    processing, by a mobile device with carrier aggregation, a voice call via a first Radio Access Technology (RAT), the processing of the voice call causing second RAT capabilities of the mobile device to go out of service;
    obtaining assistance data that includes information for capturing reference signals of a wireless communications network suitable for performing a positioning process with the mobile device during the voice call over the first RAT;
    based on the obtained assistance data, searching for the reference signals using an available receiver of the mobile device to access the wireless communications network;
    providing signal measurements generated from captured reference signals to a position determining entity; and
    obtaining a position of the mobile device from the position determining entity.

2. The method of claim 1, wherein the available receiver is a carrier aggregation receiver.

3. The method of claim 2, wherein the first RAT is a non-Long Term Evolution (LTE) RAT and the second RAT is an LTE RAT, further comprising:
    accessing a LTE wireless communications network with the carrier aggregation receiver using the LTE RAT;
    capturing the reference signals based on the assistance data using the carrier aggregation receiver, the reference signals comprising at least one of positioning reference signals (PRS) and cell-specific reference signals (CRS);
    computing one or more of reference signal time difference (RSTD) measurements and round trip time (RTT) measurements from the captured reference signals;
    communicating the computed one or more RSTD measurements and RTT measurements to a position determining entity; and
    obtaining the position of the mobile device from the position determining entity.

4. The method of claim 3, wherein the obtained position is a position determined by observed time difference of arrival positioning utilizing the RSTD measurements.

5. The method of claim 3, wherein the obtained position is a position determined by enhanced cellID positioning utilizing the RTT measurements.

6. The method of claim 1, wherein the obtained assistance data is obtained from one or more of available assistance data stored on the mobile device, new assistance data generated by the mobile device, or a combination thereof, and wherein the mobile device comprises the position determining entity.

7. The method of claim 1, wherein the positioning process is automatically initiated when an emergency call is placed or received by the mobile device.

8. The method of claim 1, further comprising:
accessing a first wireless communications network with a carrier aggregation receiver of the mobile device using the first RAT;
accessing a second wireless communications network with a second, independently tunable, receiver of the mobile device using the second RAT, different from the first RAT;
gathering different types of positioning information from different types of reference signals broadcast over the first and second wireless communications networks;
providing signal measurements generated from the different types of signals to the position determining entity; and
obtaining the position of the mobile device determined by the position determining entity from the combination of signal measurements corresponding to the different types of signals.

9. The method of claim 8, wherein the second, independently tunable, receiver of the mobile device is a global navigation satellite system (GNSS) receiver tuned to receive signals broadcast by GNSS satellite systems.

10. The method of claim 1, wherein the first RAT is a non-Long Term Evolution (LTE) RAT and the second RAT is an LTE RAT, and wherein the positioning process is an LTE positioning process performed while the mobile device is connected to a non-LTE wireless communications network during the call, and after LTE capabilities of the mobile device go out of service.

11. A mobile device with carrier aggregation for performing a mobile device positioning process, comprising:
a memory; and
a processor coupled with the memory, wherein the processor configured to:
process a voice call via a first Radio Access Technology (RAT), the processing of the voice call causing second RAT capabilities of the mobile device to go out of service, wherein the mobile device has carrier aggregation capabilities or at least one receive only receiver,
obtain assistance data that includes information for capturing reference signals of a wireless communications network suitable for performing a positioning process with the mobile device during the voice call over the first RAT,
based on the obtained assistance data, search for the reference signals using an available receiver of the mobile device to access the wireless communications network,
provide signal measurements generated from captured reference signals to a position determining entity, and
obtain a position of the mobile device from the position determining entity.

12. The mobile device of claim 11, wherein the available receiver is a carrier aggregation receiver.

13. The mobile of claim 12, wherein the first RAT is a non-Long Term Evolution (LTE) RAT and the second RAT is an LTE RAT, further comprising the processor to:

access a LTE wireless communications network with the carrier aggregation receiver using the LTE RAT,
capture the reference signals based on the assistance data using the carrier aggregation receiver, the reference signals comprising at least one of positioning reference signals (PRS) and cell-specific reference signals (CRS),
compute one or more of reference signal time difference (RSTD) measurements and round trip time (RTT) measurements from the captured reference signals,
communicate the computed one or more RSTD measurements and RTT measurements to a position determining entity, and
obtain the position of the mobile device from the position determining entity.

14. The mobile device of claim 13, wherein the obtained position is a position determined by observed time difference of arrival positioning utilizing the RSTD measurements.

15. The mobile device of claim 13, wherein the obtained position is a position determined by enhanced cellID (ECID) utilizing the RTT measurements.

16. The mobile device of claim 11, wherein the obtained assistance data is obtained from one or more of available assistance data stored on the mobile device, new assistance data generated by the mobile device, or a combination thereof, and wherein the mobile device comprises the position determining entity.

17. The mobile device of claim 11, wherein the positioning process is automatically initiated when an emergency call is placed or received by the mobile device.

18. The mobile device of claim 11, further comprising the processor to:
access a first wireless communications network with a carrier aggregation receiver of the mobile device using the first RAT;
access a second wireless communications network with a second, independently tunable, receiver of the mobile device using the second RAT, different from the first RAT,
gather different types of positioning information from different types of reference signals broadcast over the first and second wireless communications networks;
provide signal measurements generated from the different types of signals to the position determining entity, and
obtain the position of the mobile device determined by the position determining entity from the combination of signal measurements corresponding to the different types of signals.

19. The mobile device of claim 18, wherein the second, independently tunable, receiver of the mobile device is a global navigation satellite system (GNSS) receiver tuned to receive signals broadcast by GNSS satellite systems.

20. The mobile device of claim 11, wherein the first RAT is a non-Long Term Evolution (LTE) RAT and the second RAT is an LTE RAT, and wherein the positioning process is an LTE positioning process performed while the mobile device is connected to a non-LTE wireless communications network during the call, and after LTE capabilities of the mobile device go out of service.

21. A non-transitory computer readable storage medium including instructions that, when executed by a processor, cause the processor to perform a method for performing a mobile device positioning process, the method comprising:
processing, by a mobile device with carrier aggregation, a voice call via a first Radio Access Technology (RAT), the processing of the voice call causing second RAT capabilities of the mobile device to go out of service;

obtaining assistance data that includes information for capturing reference signals of a wireless communications network suitable for performing a positioning process with the mobile device during the voice call over the first RAT;

based on the obtained assistance data, searching for the reference signals using an available receiver of the mobile device to access the wireless communications network;

providing signal measurements generated from captured reference signals to a position determining entity; and obtaining a position of the mobile device from the position determining entity.

22. The non-transitory computer readable storage medium of claim 21, wherein the available receiver is a carrier aggregation receiver.

23. The non-transitory computer readable storage medium of claim 22, wherein the first RAT is a non-Long Term Evolution (LTE) RAT and the second RAT is an LTE RAT, further comprising:

accessing a LTE wireless communications network with the carrier aggregation receiver using the LTE RAT;

capturing the reference signals based on the assistance data using the carrier aggregation receiver, the reference signals comprising at least one of positioning reference signals (PRS) and cell-specific reference signals (CRS);

computing one or more of reference signal time difference (RSTD) measurements and round trip time (RTT) measurements from the captured reference signals;

communicating the computed one or more RSTD measurements and RTT measurements to a position determining entity; and obtaining the position of the mobile device from the position determining entity.

24. The non-transitory computer readable storage medium of claim 21, wherein the obtained assistance data is obtained from one or more of available assistance data stored on the mobile device, new assistance data generated by the mobile device, or a combination thereof, and wherein the mobile device comprises the position determining entity.

25. The non-transitory computer readable storage medium of claim 21, wherein the positioning process is automatically initiated when an emergency call is placed or received by the mobile device.

26. A mobile device with carrier aggregation for performing a mobile device positioning process, comprising:

means for processing, by a mobile device with carrier aggregation, a voice call via a first Radio Access Technology (RAT), the processing of the voice call causing second RAT capabilities of the mobile device to go out of service;

means for obtaining assistance data that includes information for capturing reference signals of a wireless communications network suitable for performing a positioning process with the mobile device during the voice call over the first RAT;

means for based on the obtained assistance data, searching for the reference signals using an available receiver of the mobile device to access the wireless communications network;

means for providing signal measurements generated from captured reference signals to a position determining entity; and means for obtaining a position of the mobile device from the position determining entity.

27. The mobile of claim 26, wherein the available receiver is a carrier aggregation receiver.

28. The mobile device of claim 27, wherein the first RAT is a non-Long Term Evolution (LTE) RAT and the second RAT is an LTE RAT, further comprising:

means accessing a LTE wireless communications network with the carrier aggregation receiver using the LTE RAT;

means for capturing the reference signals based on the assistance data using the carrier aggregation receiver, the reference signals comprising at least one of positioning reference signals (PRS) and cell-specific reference signals (CRS);

means for computing one or more of reference signal time difference (RSTD) measurements and round trip time (RTT) measurements from the captured reference signals;

means for communicating the computed one or more RSTD measurements and RTT measurements to a position determining entity; and means for obtaining the position of the mobile device from the position determining entity.

29. The mobile device of claim 26, wherein the obtained assistance data is obtained from one or more of available assistance data stored on the mobile device, new assistance data generated by the mobile device, or a combination thereof, and wherein the mobile device comprises the position determining entity.

30. The mobile device of claim 26, wherein the positioning process is automatically initiated when an emergency call is placed or received by the mobile device.

* * * * *